(No Model.)
J. J. BLACK.
ROAD WAGON.
No. 439,097. Patented Oct. 28, 1890.
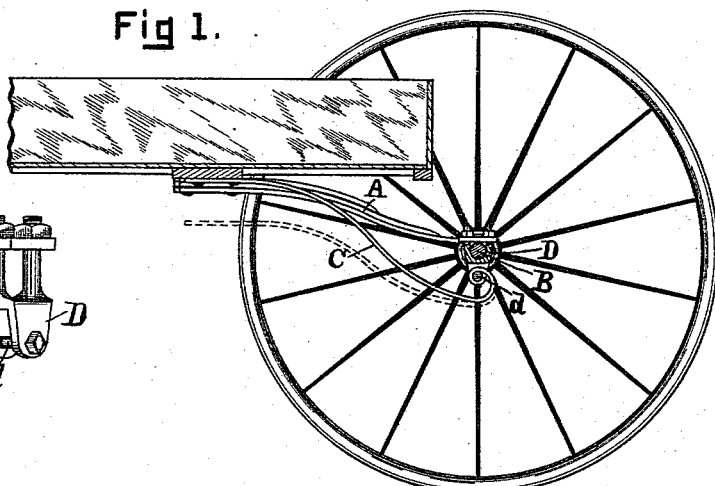
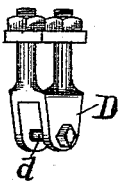
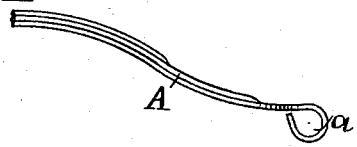
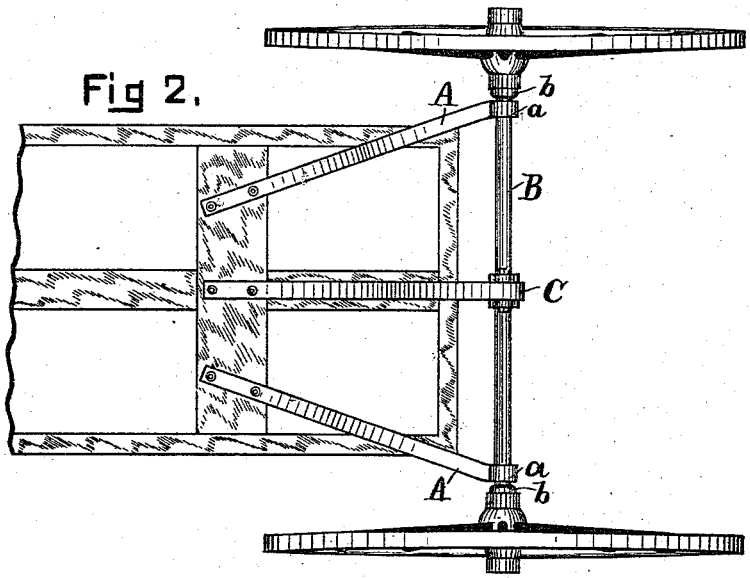
WITNESSES.
Frank Miller.
Albert H. Bates.
INVENTOR.
John J. Black
By his Attorneys
Watson & Thurston

UNITED STATES PATENT OFFICE.

JOHN J. BLACK, OF CLEVELAND, OHIO, ASSIGNOR TO THE BLACK SPRING AND GEAR COMPANY, OF SAME PLACE.

ROAD-WAGON.

SPECIFICATION forming part of Letters Patent No. 439,097, dated October 28, 1890.

Application filed June 23, 1890. Serial No. 356,322. (No model.)

*To all whom it may concern:*

Be it known that I, JOHN J. BLACK, a citizen of the United States, residing at Cleveland, in the county of Cuyahoga and State of Ohio, have invented certain new and useful Improvements in Road-Wagons, of which the following is a full, clear, and exact description, reference being had to the accompanying drawings, in which—

Figure 1 is a longitudinally-sectional view of the rear end of a vehicle containing my invention. Fig. 2 is a plan view of the under side of said vehicle. Fig. 3 is a detached perspective view of the device for securing the middle spring to the axle, and Fig. 4 is a side view of the rear end of one of the side springs.

My invention relates to the spring-platform for sustaining the rear end of a wagon-body and connecting the same with the rear axle.

The primary object of my invention is to provide a novel back spring-platform for vehicles, which is simple, cheap, and easily attached to said vehicles, and a further object of one form of the invention is to prevent that oscillatory movement of the rear axle observable in many constructions, which changes the "set" of the axle and by consequence the "gather" of the wheels.

My invention consists in the combination of a wagon-body, an axle, and two springs rigidly secured to the body at their front ends and pivotally secured to the axle at their rear ends, with a third spring rigidly secured to the body at its front end and positively secured to the axle at its rear end.

It also consists in the combination of a wagon-body, an axle, and two springs rigidly secured to the body at their forward ends and pivotally connected with said axle at their rear ends, with a third spring rigidly secured at its forward end to the wagon-body and having its rear end extended beyond said axle and there bent forward, a vertical arm secured to said axle, and a pivotal connection between said arm and the forwardly-bent end of the last-named spring.

It also consists of such other combinations and structural details as are hereinafter described, which are definitely pointed out in the claim.

I will now proceed to describe the embodiment of my invention shown in the drawings, referring to the parts by letters.

A A represent two springs, the inner ends of which are secured by bolts or clips or other suitable devices to the under side of the wagon-body. These springs may be made in any suitable form, although the drawings show them to be and I prefer to make them in the form of flat-leaf springs containing as many leaves as desired. These springs diverge from the points of connection with the wagon-body, whereby their outer ends are adapted to engage with the rear axle at points near the wheels for the purpose of giving a broader and therefore more stable support to the wagon-body. The rear ends of these springs are pivotally connected with the axle, and the best means for securing this connection is to bend the rear ends of said springs, as shown most clearly in Fig. 4, thereby forming an eye $a$ on the end, through which eye a cylindrical part of the axle B passes. Shoulders $b$ on the axle prevent the outer ends of the springs from spreading sidewise.

When the wagon is weighted and the springs A A thereby straightened and lengthened, the axle B is moved bodily backward; but for the reason that the rear ends of the springs are pivotally connected with the axle this movement does not of necessity change the set of said axle; but unless some means to prevent such action were provided the revolution of the wheels would cause the axle to revolve within the eyes $a$ on the springs A, which action is very objectionable, especially where the wheels are gathered or inclined slightly inward at the bottom, inasmuch as the direction and extent of this gathering is determined by the construction and set of the axle.

The means provided for preventing the revolution of the axle B consists of a third spring C, arranged between the two springs A A and secured at its front end by clips or bolts to the wagon-body. The rear end of this spring is positively fastened to the axle—that is to say, it is fastened in such a manner as to prevent the revolution thereof. This spring C bears little, if any, of the weight of the wagon, and therefore it may be, and by preference is, made in the form of a single flat leaf. The best form of this spring C and the best means for connecting it with the axle are those shown in the drawings, wherein D represents an arm rigidly secured to the axle and standing in a substantially vertical position, the end of this arm being forked, as shown in Fig. 3. The spring C extends behind the axle and is then bent forward into substantially U form, as shown in the drawings, and this end is pivotally connected with the arm D. This pivotal connection is made by bending the end of the spring to form an eye, as shown in Fig. 4, inserting this eye between the two forked ends of the arm D, and passing the pivot-bolt $d$ through said forked ends and eye. The U-shaped end of the spring C is so bent that it exerts a continued downward pressure upon the pivot-bolt $d$. When the wagon is weighted, the spring C is straightened, and thereby lengthened; but this straightening takes place for most part in that part of the spring which is in front of the axle, while that part of the spring behind the axle moves slightly upward, and the upper and forwardly bent end moves slightly forward to compensate as far as is necessary for its increase in length, the end of the spring turning upon its pivot-bolt in so moving. This spring, however, continues to exert a substantially downward pressure upon this pivot-bolt, which prevents any oscillating movement of the axle, and therefore the set of the axle is not materially changed by any movement of the wagon-body or springs.

Having thus described my invention, what I claim as new, and desire to secure by Letters Patent, is—

The combination of a wagon-body, a cylindrical axle B, having the shoulders $b$, and two leaf-springs A A, having their rear ends bent to form eyes, the leaf-spring C, having its rear end bent into U form and having its extreme end bent to form an eye, the forked arm D, secured in a vertical position to the axle, and the pivot-bolt $d$, substantially as and for the purpose specified.

JOHN J. BLACK.

Witnesses:
   THOS. C. WILLARD,
   ALBERT H. BATES.